United States Patent Office 3,280,017
Patented Oct. 18, 1966

3,280,017
PROCESS FOR THE PREPARATION OF HETERO-ATOM CONTAINING ORGANIC COMPOUNDS
Karl W. Hubel and Emile Henri Braye, Brussels, Belgium, assignors to Union Carbide Corporation, a corporation of New York
No Drawing. Filed Mar. 31, 1960, Ser. No. 18,805
Claims priority, application Great Britain, Apr. 7, 1959, 11,679/59
17 Claims. (Cl. 204—158)

This invention relates to the prepartion of organic compounds and to products resulting therefrom. More particularly, it relates to a process for the preparation of linear or five or six membered cyclic compounds containing at least one hetero atom.

The present invention greatly facilitates the synthesis of substituted or unsubstituted organic compounds in that it provides a new and general one-step method for this purpose. The invention is predicated upon the discovery that when certain organo-metallic complexes, as hereinafter described, whose organic part contains a preformed carbon skeleton, are reacted with compounds containing at least one element or reactant capable of forming stable bonds with the skeleton, the bonding of the element to the skeleton is readily achieved. The compounds formed thereby are characterized as containing at least one of the carbon skeletons and at least one of the elements.

Although the mechanism of the reaction is not fully understood, basic considerations applying to the inventive process can be found in the following discussion. It is believed that organo-metallic complexes as for example, $Fe_2(CO)_6(RC_2R)_2$ or $Fe_2(CO)_7(RC_2R)_2$ can be represented by the structures respectively shown below, wherein the actual meaning of R has been disregarded for the sake of clarity.

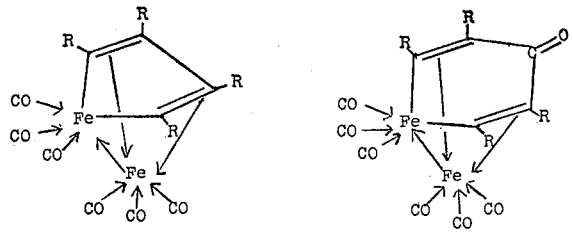

In the structural formulas of the organo-metallic complexes, the arrows from the $R'C_2R''$ moieties to the metal atoms represent the type of chemical bonds conveniently referred to as pi-bonds.

There are various evidences which indicate that the two iron atoms contained in these organo-metallic complexes have different chemical behavior. In particular it has been found that the iron atom bonded into the ring system can be more readily removed than the other iron atom. It can thus be foreseen that the splitting of the iron atoms which occurs during the reaction isolates a highly reactive carbon skeleton which can readily react with any element capable of forming stable bonding with that carbon skeleton. Similar considerations apply to the various organo-metallic complexes containing only one metal atom or one ($R'C_2R''$) group and apply as well to the complexes having a larger number of metal atoms or ($R'C_2R''$) groups in their structure. It is therefore apparent that by properly selecting the reactant containing an element capable of forming stable bondings with the carbon skeleton, a large variety of organic compounds can be provided.

According to this invention, a process for the preparation of substituted or unsubstituted hetero-linear or five or six-membered hetero-cyclic compounds comprises reacting an organo-metallic complex having the formula: $M_x(CO)_y(R'C_2R'')_z(B)_w$ with an element belonging to Groups IIIA, IVA, VA, or VIA of the Periodic Table, or a compound containing at least one of the elements of those groups. In the above referred to organo-metallic complexes, M represents a transition metal belonging to the VI, VII or VIII subgroups of the Periodic Table, CO represents a carbonyl group, R' and R'' may be the same or different and represent hydrogen, halogeno, carboalkoxy, alkyl, aryl, cycloaliphatic, alkoxy or silyl groups and the like, including the substituted derivatives thereof, $C_2$ represents a carbon to carbon bonding, B represents a member selected from the group consisting of hydrogen, mercury, halogen, alkyl, aryl or acyl, x represents an integer of from 1 to 4, y represents an integer of from 1 to 10, z represents an integer of from 1 to 6, and w represents an integer of from 0 to 4.

Typical organo-metallic complexes suitable for use in the process of this invention include: $Fe_2(CO)_6(RC_2R')_2$, wherein R represents a phenyl or ethyl group or a hydrogen atom and wherein R' represents a phenyl, methyl, ethyl or methoxy group or a hydrogen atom.

$$Fe_2(CO)_8(RC_2R')_2(B)_2$$

wherein R and R' represent hydrogen and B represents either hydrogen or a methyl residue. These complexes may be represented by the following structure:

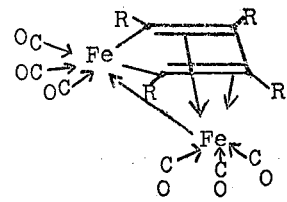

$Fe_2(CO)_7(RC_2R')_2$, wherein R and R' represent phenyl groups. This complex may be represented by the following structure:

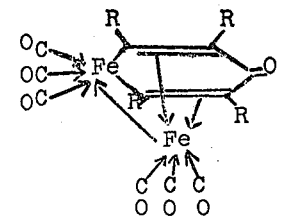

$Fe_2(CO)_6(RC_2R')$, wherein R and R' represent phenyl groups. This complex may be represented by the following structure:

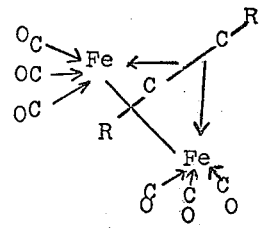

$Fe(CO)_4(RC_2R')_2$ wherein R represents a phenyl group and wherein R' represents a phenyl group or a hydrogen atom. This complex may be represented by the following structure:

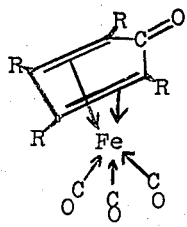

Fe(CO)$_6$(RC$_2$R'), wherein R represents a hydrogen atom or a phenyl group and wherein R' represents a hydrogen atom. This complex may be represented by the following structure:

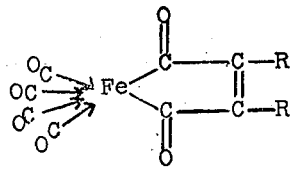

Fe$_3$(CO)$_8$(RC$_2$R')$_2$, wherein R and R' represent phenyl groups. This complex may be represented by the following structure:

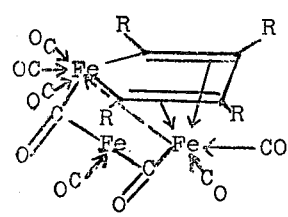

Fe$_2$(CO)$_6$(RC$_2$H)$_3$, wherein R represents a phenyl group. This complex may be represented by the following structure:

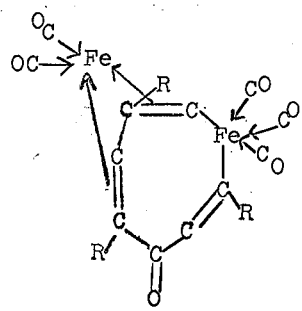

Fe(CO)$_4$(RC$_2$H)$_3$, wherein R represents a phenyl group or a hydrogen atom. This complex may be represented by the following structure:

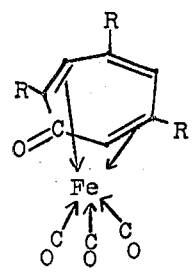

CO$_2$(CO)$_6$(RC$_2$R'), wherein R represents a phenyl group and R' represents a phenyl group or a carbomethoxy group. This complex may be represented by the following structure:

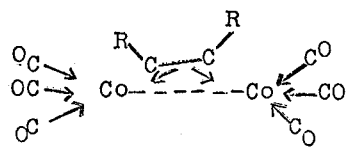

CO$_2$(CO)$_4$RC$_2$R')$_3$, wherein R represents a carboethoxy or methyl group or a hydrogen atom and wherein R' represents a phenyl group or a trimethylsilyl group. This complex may be represented by the following structure:

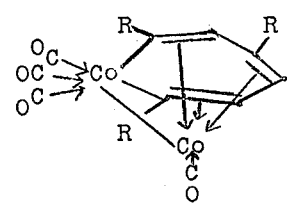

CO$_2$(CO)$_6$(RC$_2$H)$_4$Hg, wherein R represents a tertiary butyl or trimethylsiyly group. This complex may be represented by the following structure:

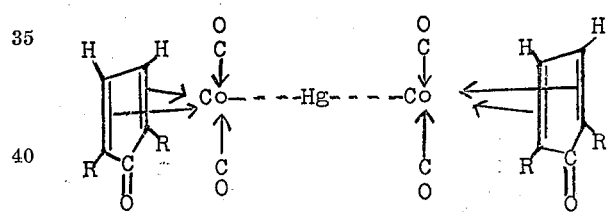

CO$_2$(CO$_6$(RC$_2$H)$_4$, wherein R represents a tertiary butyl or trimethylsilyl group. This complex may be represented by the following structure:

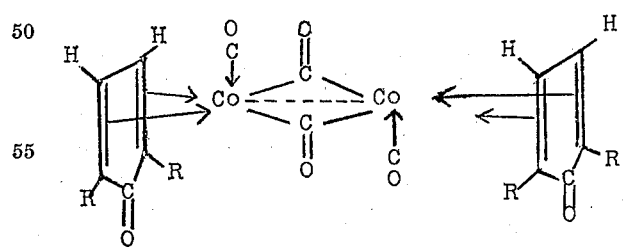

Co$_3$(CO)$_9$H(RC$_2$H), wherein R represents a phenyl group. This complex may be represented by the following structure:

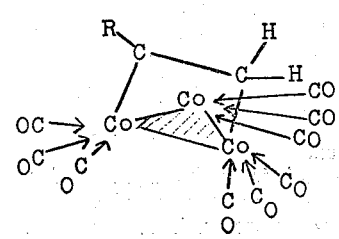

Ni(CO)$_2$(RC$_2$R')$_4$, wherein R and R' represent phenyl groups. This complex may be represented by the following structure:

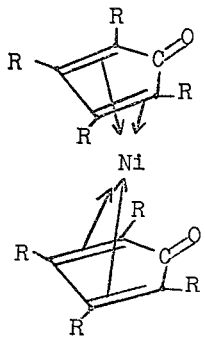

and,

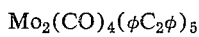

Mo$_2$(CO)$_4$($\phi$C$_2\phi$)$_5$

Other useful organo-metallic complexes are those in which the transition metal is ruthenium, rhodium, palladium, osmium, iridium, platinum, manganese, rhenium, chromium or tungsten, or are those in which the carbonyl group bonded to the metal is partially replaced by a nitrosyl, a substituted stibine, a substituted arsine, or a substituted phosphine.

The organo-metallic complexes employed as starting materials in the present invention may be conveniently prepared by the process described in copending application 707,111, entitled "Organo-Metallic Compounds and Method for Their Preparation," filed January 6, 1958, in the name of Karl Walter Hubel, and now abandoned, the description thereof being incorporated herein by reference.

Briefly stated, the organo-metallic complexes can be prepared by reacting an acetylenic compound with a metal carbonyl in a non-aqueous neutral medium at a temperature of between room and 300° C. As a consequence, a stable organo-metallic carbonyl reaction product is formed. The acetylenic reactant has the formula:

wherein R' and R" represents a substituent selected from the group consisting of hydrogen, an organic group, and substituted derivatives thereof, a functional group and substituted derivatives thereof and an organo-substituted hydride group, the substituent being substantially inert to and inactive with the carbonyl group. The metals of the metal carbonyl group are selected from the group consisting of iron, nickel, ruthenium, rhodium, palladium, osmium, iridium, platinum, manganese, rhenium chromium, molybdenum, cobalt and tungsten.

For the process of this invention any element or compound containing at least one of the elements of Groups IIIA, IVA, VA or VIA of the Periodic Table may be reacted with the organo-metallic complex. Thus, for example, boron, aluminum, gallium, indium, thallium, carbon, silicon, germanium, tin, lead, nitrogen, phosphorus, arsenic, antimony, bismuth, oxygen, sulfur, selenium, tellurium, or inorganic and organic derivatives thereof in which these elements have a high degree of activity, may be employed in the process of the present invention.

However, particularly suitable as reactants are those elements belonging to Groups VA or VIA of the Periodic Table (or compounds containing at least one of those elements). Typical representatives of such reactants include, NOCl, nitrosobenzene, N,N-dichloro-p-toluene-sulfonamide, phenyldichlorophosphine (C$_6$H$_5$PCl$_2$), benzyldichlorophosphine (C$_6$H$_5$CH$_2$PCl$_2$), phenyldichloroarsine (C$_6$H$_5$AsCl$_2$), oxygen, sulfur, selenium polysulfides, mono- and di-halogeno-phosphines, arsines, or stibines, polyselenides, sulfur dioxides, potassium selenocyanide (KSeCN), tin tetrachloride, bromine, sulfur dichloride and (C$_6$H$_5$)$_3$PSe.

For the purposes of this invention, the Periodic Table herein referred to is contained on pages 392 and 393, of The Handbook of Chemistry and Physics, 37th edition, published by the Chemical Rubber Publishing Co.

The process of this invention can be carried out using stoichiometric amounts of the starting materials. However, it has been found that an excess of the aforesaid metal or metaloid reactant is generally preferably. The reaction is usually carried out in a polar or non-polar organic solvent such as benzene, petroleum ether, ether, tetrahydrofuran, beta-ethoxy ethanol and the like. When side reactions are to be avoided, the selected solvent should preferably be of an inert kind. However, no addition of solvent is necessary when one of the starting materials is liquid at the reaction temperature.

The reaction is usually achieved by heating the reaction mixture, or by activating the reaction mixture with ultraviolet radiations, or by combining both heating and ultraviolet radiations. However, when employing reactants normally used at relatively low temperatures such as Cl$_2$O or NCl$_3$, it is advisable to cool the reaction mixture down to 0° C. or lower. Generally speaking, the reaction temperature at which the process of this invention may be carried out ranges from about −60° C. to about 250° C. The specific temperatures employed will, of course, depend upon the specific reactants employed. It is preferable to perform the reaction in a closed system whenever one of the reactants, or the reaction products formed thereby, or the solvent employed are too volatile at the reaction temperatures.

The reaction is usually completed within a few hours, although longer reaction times may be necessary in some instances. The reaction products are easily removable from the reaction mixture after completion of the reaction using any suitable technique. The technique of removal will of course vary according to the nature of the reaction product and the occurrence of side reactions. Suitable process conditions will be further illustrated in the specific examples hereinafter described relating to the present invention.

Typical compounds prepared by the process of this invention may be illustrated by the following general formulae:

(A)   R—X—CR=CR—CR=CR—XR
(B)   RX=CR—CHR—CHR—CR=XR (C) 

(D) 

wherein R represents hydrogen or hydroxyl, halogeno, carboalkoxy, alkyl, aryl, cycloaliphatic alkoxy, or silyl groups including the substituted derivatives thereof and X represents a hetero-atom selected from the elements contained in Groups IIIA, IVA, VA and VIA of the Periodic Table, it being understood in compounds (C) and (D) above, that the valency of the hetero-atom will determine if an R group is attached thereto.

These compounds are by way of illustration only. Other saturated and unsaturated substituted or unsubstituted organic compounds containing a hetero-atom may be also prepared. In general, however, the hetero-atom containing compounds formed by the process of this invention will contain at least one (R'C₂R'') unit, wherein R' and R'' have the meanings previously defined.

Of particular note, is the preparation of heretofore undisclosed classes of compounds, namely five-membered heterocyclic systems containing phosphorus or arsenic atoms, and six-membered heterocyclic systems containing selenium atoms. For the purposes of this invention, the five-membered phosphorus or arsenic compounds are herein referred to as phosphole and arsole compounds respectively.

The five-membered heterocyclic systems prepared employing the process of this invention include: 2,5-dimethyl 3,4 - diphenylthiophene; tetraphenylselenophene; pentaphenylphosphole; p - benzyl-tetraphenylphosphole; pentaphenylarsole; and tetraethylselenophene.

The six-membered heterocyclic systems prepared employing the process of the subject invention include: tetraphenyl-γ-pyrone; tetraphenyl-1-thia-4-pyrone; and tetraphenyl-1-selena-4-pyrone.

The linear compounds prepared employing the process of the subject invention include: 1,4 bis-(p.toluene-sulfonamido) 1,2,3,4-tetraphenylbutadiene; and 1,4- bis-(p.toluene-sulfonimino) 1,4-dimethoxy-butane.

The invention may be further illustrated by the following examples:

Example I 1.6 grams of $Fe_2(CO)_7(C_6H_5C_2C_6H_5)_2$ and 2 grams of nitrosobenzene were dissolved in 150 ml. benzene in a quartz vessel and the solution was irradiated with U.V. light (125 w. high pressure Hg-lamp) for about 6 hours. The reaction mixture was passed over a chromatographic column and yielded: —0.09 gram of tetraphenyl-γ-pyrone, M.P. 285–290° C., whose structure was proven by its I.R. spectrum and analysis.

ANALYSIS

|   | Found | Theoretical Calculated for $C_{29}H_{20}O_2$ |
| --- | --- | --- |
| C | 86.13 | 86.98 |
| H | 4.79 | 5.03 |
| O | 8.18 | 7.99 | and 0.1 gram of a product melting at 195–7° C. and crystallizing from ethanol in colorless needles. Analysis showed that this compound corresponded to $$(C_6H_5C_2C_6H_5)_2(CO)O_2$$

this product appeared to be the oxidation product of the organic part of the initial complex.

ANALYSIS

|   | Found | Theoretical Calculated for $C_{29}H_{20}O_3$ |
| --- | --- | --- |
| C | 83.24 | 83.62 |
| H | 4.63 | 4.84 |

Apart from those products, small amounts of tetracyclone and tetraphenyl-n-quinone were found which are formed by side reactions.

Example II

A solution of sodium polysulfide was prepared by adding 0.58 gram of sulphur to a solution of 1.08 grams Na₂S·9H₂O in 130 ml. of β-ethoxy-ethanol. To that reaction mixture there was added 1 gram of $$Fe_2(CO)_7(C_6H_5C_2C_6H_5)_2$$

The mixture was then irradiated in a quartz vessel for 4 hours with U.V. light (125 w. lamp). The following products were obtained:

(a) Tetraphenyl-1-thia-4-pyrone, melting at 319–320, 5° C.

ANALYSIS

|   | Found | Theoretical Calculated for $C_{29}H_{20}OS$ |
| --- | --- | --- |
| C | 83.33 | 83.62 |
| H | 4.77 | 4.84 |
| O | 4.04 | 3.83 |
| S | 7.73 | 7.70 |

The yield of this compound was 36%.

(b) Tetraphenylquinone (yield–5%) and
(c) Tetraphenylhydroquinone (yield–36%).

The tetraphenyl-1-thia-4-pyrone can also be obtained by reaction with sulphur ether by heating or by irradiation with ultra-violet light.

Example III

A solution of potassium polyselenide was prepared by dissolving 5 grams of potassium in 100 ml. β-ethoxy-ethanol. Half of this solution was saturated with H₂Se. The second half was then added to the first one together with 12 grams powdered selenium. 1 gram of $$Fe_2(CO)_7(C_6H_5C_2C_6H_5)_2$$

was thereupon dissolved in 32 ml. of this solution contained in a quartz vessel. This solution was irradiated with U.V. light for 2 hours. A substance of M.P. 288–292° C., containing selenium, the I.R. spectrum of which is very similar to that one of tetraphenyl-1-thia-4-pyrone was obtained. It is believed that this compound is the unknown tetraphenyl-1-selena-4-pyrone. Besides this compound, tetraphenyl-p-quinone is also obtained. The relative proportion in which those compounds are obtainable can be modified at will by choosing the proper conditions.

Example IV

A solution of 2 grams $Fe_2(CO)_6(C_6H_5C_2C_6H_5)_2$ and 2 grams of N,N-dichloro-p-toluene-sulfonamide in 250 ml. benzene was irradiated for 2 hours at about 30° C. with a 125 w. Hg-lamp. The main product (0.42 gram) obtained was a pale yellow compound of M.P. 275–276° C., the analysis and I.R. spectrum of which show that it corresponded to 1,4-bis-(p.toluene-sulfonamido) 1,2,3,4-tetraphenyl-butadiene.

ANALYSIS

|   | Found | Theoretical Calculated for $C_{42}H_{36}O_4N_2S_2$ |
| --- | --- | --- |
| C | 72.49 | 72.36 |
| H | 4.57 | 5.21 |
| O | 9.57 | 9.18 |
| N | 3.99 | 4.02 |
| S | 9.18 | 9.20 |

Example V

In a quartz vessel there was introduced 1 gram of $Fe_2(CO)_6(C_6H_5C_2C_6H_5)_2$ and 1 gram of nitrosobenzene, dissolved in 100 ml. of benzene.

The irradiation of this solution for 6 hours with U.V. light yielded pentaphenylpyrrole (M.P. 291° C.). The yield was about 51%.

Example VI 1 gram of $Fe_2(CO)_6(C_6H_5C_2C_6H_5)_2$ and 2 grams of sulphur were pulverized together and this mixture was heated at 200° C. for about ten minutes. The reaction yielded about 80% tetraphenylthiophene (M.P. 183° C.) Tetraphenylthiophene can also be prepared by irradiating a benzenic solution of both components with U.V. light (about 6 hours; 50% yield).

Example VII

An intimate mixture of 1 gram $Fe_2(CO)_6(C_6H_5C_2H)_2$ and 2 grams of sulphur, was heated at 200° C. for 5 minutes. 2,5-diphenylthiophene (M.P. 153–153.5° C.) was obtained in 65% yield.

Example VIII

An intimate mixture of 0.92 gram of $$Fe_2(CO)_6(C_6H_5C_2CH_3)_2$$

and 2 grams of sulphur was heated by dipping the vessel in an oil bath at 180–190° C. for about 7 minutes. The reaction yielded 11% of a dimethyl-diphenylthiophene of M.P. 113–114° C. which was believed to be the 2,5 dimethyl-3,4 diphenyl isomer.

ANALYSIS

|   | Found | Theoretical Calculated for $C_{18}H_{16}S$ |
| --- | --- | --- |
| C | 81.53 | 81.76 |
| H | 6.12 | 6.10 |

Example IX 0.9 gram of $Fe_2(CO)_6(C_6H_5C_2C_6H_5)_2$ and 0.5 gram of sulphur were pulverized and heated together at 200° C. for 5 minutes.

Tetraphenylthiophene was obtained with a yield of 80%.

Example X 1 gram of $Fe_2(CO)_6(C_6H_5C_2C_6H_5)_2$ and an excess (5 grams) of pulverized amorphous selenium were mixed intimately and heated for 20 minutes at 200° C. From the reaction mixture there was isolated 60% of a colorless organic substance. I.R. spectrum and analysis identified this product as tetraphenylselenophene. Crystallized from $CH_2Cl_2/C_2H_5OH$, it melted initially at 174° C., and then recrystallized and melted again at 182° C.

ANALYSIS

|   | Found | Theoretical Calculated for $C_{28}H_{20}Se$ |
| --- | --- | --- |
| C | 77.11 | 77.29 |
| H | 4.56 | 4.98 |

Tetraphenylselenophene was also obtainable (yield 25%) by irradiating with U.V. light a solution of $Fe_2(CO)_6(C_6H_5C_2C_6H_5)_2$ with a suspension of amorphous selenium in piperidine.

Another useful reactant for the preparation of substituted or unsubstituted selenophenes is $(C_6H_5)_3PSe$.

Example XI 1 gram of $Fe_2(CO)_6(C_6H_5C_2C_6H_5)_2$ and 5 ml. of $C_6H_5PCl_2$ were heated for 30 minutes at about 140° C. A pale yellow organic substance having a M.P. of 255–256° C. was obtained in a 66% yield. Analysis showed that this compound has a formula $C_{34}H_{25}P$.

ANALYSIS

|   | Found | Theoretical Calculated for $C_{34}H_{25}P$ |
| --- | --- | --- |
| C | 87.47 | 87.93 |
| H | 5.27 | 5.43 |
| P | 6.34 | 6.68 |

Example XII 1 gram (1.5 ml.) $Fe_2(CO)_6(C_6H_5C_2C_6H_5)_2$, 0.4 gram (3 ml.) $C_6H_5CH_2PBr_2$ and 20 ml. $C_6H_6$ were heated for 15 hours at 170° C. in a sealed tube. Besides 0.14 gram $Fe(CO)_3(C_6H_5C_2C_6H_5)_2$ and 0.09 gram tetracyclone, 0.07 gram of a yellow-, strongly fluorescent p-benzyl-p-oxide-tetraphenyl-phosphole having a M.P. of 220–227° C. was isolated by chromatography. This phosphole-oxide was formed by air oxidation of the primarily formed P-benzyl-tetraphenyl-phosphole.

ANALYSIS

|   | Found | Theoretical Calculated for $C_{35}H_{27}OP$ |
| --- | --- | --- |
| C | 84.35 | 85.01 |
| H | 5.46 | 5.10 |

Example XIII

A solution of 1.46 grams (2.3 mm.) (millimoles) $Fe_2(CO)_6(C_6H_5C_2C_6H_5)_2$ and 1.5 ml. $C_6H_5AsCl_2$ in 200 ml. $CH_2Cl_2$ was irradiated for 22 hours in a quartz vessel at about 30° C. with a 125 w. high-pressure-Hg-lamp. By chromatography on $Al_2O_3$, 0.03 gram penta-phenyl-arsole, a yellow fluorescent compound, of m.p. 213–214.5° C. was isolated. Some tetracyclone was also recovered.

ANALYSIS

|   | Found | Theoretical Calculated for $C_{24}H_{25}As$ |
| --- | --- | --- |
| C | 80.46 | 80.30 |
| H | 4.88 | 4.96 |

Penta-phenyl-arsole was also obtained by using $Fe_2(CO)_5 \cdot P(C_6H_5)_3 \cdot (C_6H_5C_2C_6H_5)_2$ as starting material.

Example XIV

A tenfold excess of NOCl was condensed into a solution of 2 grams $Fe_2(CO)_6(C_6H_5C_2C_6H_5)_2$ in 50 ml. $CH_2Cl_2$ at −70° C. The temperature increased to room temperature in about 3 hours. The solvents and the unreacted NOCl were then removed under vacuum and the residue was dissolved in 100 ml. acetic acid and an excess of zinc powder and 20 ml. concentrated HCl was added. The reaction was left overnight. After filtration, and the addition of water and benzene, the mixture was made alkaline with NaOH. From the benzene layer, there was isolated, by chromatography, 0.4 gram (34%) 2,3,4,5-tetraphenylpyrrole, m.p. 214.5° C.

Example XV

To a solution of 2 grams (2.3 mm.) (millimoles) $Fe_2(CO)_5 \cdot P(C_6H_5)_3 \cdot (C_6H_5C_2C_6H_5)_2$ in 200 ml. $CH_2Cl_2$, there was added a solution of $Br_2$ (4.6 mm.) in $CH_2Cl_2$ at room temperature. After half an hour, the mixture was shaken with an aqueous solution of $NaHSO_3$. 0.12 gram tetraphenylfurane (m.p. 174° C.), was isolated from the organic layer.

Example XVI $Na_2S_x$ was prepared by heating 2 grams $Na_2S$ and 1 gram sulphur in 100 ml. β-ethoxy-ethanol ("Cellosolve"). 1 gram of $Fe_2(CO)_6(C_2H_5C_2C_2H_5)_2$ was then added and the mixture was refluxed for 3 hours. After cooling, water was added and the reaction product was extracted with petroleum ether. The organic layer was passed over a $Al_2O_3$-column. The fraction eluted with benzene yielded a colorless oil (0.2 gram) of b.p.: 100–110° C./15 mm. Hg, $n_D^{2.3.4}=1.5060$. Physical properties and analysis identified the oil as tetra-ethyl-thiophene.

ANALYSIS

|   | Found | Theoretical Calculated for $C_{12}H_{20}S$ |
|---|---|---|
| C | 73.18 | 73.40 |
| H | 10.39 | 10.27 |
| S | 15.90 | 16.33 |

Example XVII

A solution of 1 gram $Fe_2(CO)_6(CH_3OOCC_2COOCH_3)_2$ and 0.5 ml. $SCl_2$ in 50 ml. $CCl_4$ was irradiated, in a quartz vessel, with U.V. light for one hour. The solution was washed with water and extracted with $CH_2Cl_2$. By chromatography, 0.03 gram tetracarbomethoxy-thiophene, M.P. 122–8° C., was isolated. In addition 45% unreacted complex also remained.

Example XVIII

By the same procedure as described in Example XVII, but using $K_2Se_x$ and $Fe_2(CO)_6(C_2H_5C_2C_2H_5)_2$ a colorless selenium-containing oil of B.P. 120/20 mm. Hg, was obtained which is believed to be tetra-ethyl-selenophene. Its I.R. spectrum was found to be very similar with that of tetra-ethyl-thiophene. The product was quite unstable in light, and could not be analyzed.

Example XIX 6 grams (16.5 mm.) $Fe_2(CO)_6(HC_2OCH_3)_2$ was dissolved in 100 ml. $CH_2Cl_2$, and 13 grams (54.5 mm.) N,N-di-chloro-p-toluene-sulfonamide was added in small portions at room temperature. A vigorous reaction resulted with evolution of carbon monoxide. The reaction mixture was filtered the next day, washed first with 2 N HCl. Toluene sulfonamide was extracted with 2 N $Na_2CO_3$. The organic layer was then evaporated to dryness and the products dissolved in $C_6H_6$ were separated by chromatography on silica gel. The ether fraction yielded 0.2 gram of a colorless compound which after recrystallization was found to melt at 220–221° C. The I.R. spectrum and the analysis showed it to be 1,4bis(p.-toluene-sulfonimino-) 1,4 dimethoxy-butane.

ANALYSIS

|   | Found | Theoretical Calculated for $C_{20}H_{22}O_6N_2S_2$ |
|---|---|---|
| C | 53.47 | 53.32 |
| H | 5.02 | 4.93 |
| S | 13.89–14.16 | 14.24 |

From the filtrate of the ether fraction dimethyl fumarate, M.P.=103–5° C., was also isolated as a result of the oxidation of the organic ligand.

The heterocyclic systems prepared employing the process of this invention are important intermediates for many organic synthesis. For example, they may be used in the preparation of dyes, pigments, pharmaceuticals, or for the preparation of organo-metallic complexes as disclosed in copending application 784,040, filed in the names of K. W. Hubel and E. Weiss, and now abandoned.

In particular, the five-membered cyclic substituted phosphole and arsole compounds (i.e. heterocyclic phosphorus and arsenic systems) are strongly fluorescent materials and may be employed as such. In this regard, they have a yellow-green fluorescence comparable to that of zinc sulfide. The fluorescence spectrum can be shifted by forming the corresponding phosphole or arsole oxide thereby making it possible to variably provide a fluorescent compound having the particular fluorescent spectrum desired.

These compounds also behave as dienes and can therefore, be involved in diels-alder reactions. For example, the reaction of pentaphenylphosphole with the dimethyl ester of acetylene dicarboxylic acid yields the dimethyl ester of tetraphenyl phthalic acid in almost quantitative amounts. A normal adduct is also obtained by diels-alder addition with maleic anhydride.

The six-membered heterocyclic systems are also useful as intermediates in dye preparations. Another general use resides in their reactivity with ammonia to give the corresponding γ pyridones.

In addition, these compounds can be employed as the starting material for the synthesis of natural products containing the γ-pyrone ring. These latter products are known to be part of the naturally occuring dyes such as chromones and xanthones. The linear compounds containing hetero atoms according to this invention are useful as intermediates for drug and pharmaceutical preparations.

What is claimed is:

1. A process for the preparation of a hetero-atom containing organic compound free of pi-bonds between carbon and metal, which process comprises reacting (a) an organo-metallic complex having the formula

$$M_x(CO)_y(R'C_2R'')_zB_w$$

wherein M is a transition metal of Groups VI, VII and VIII of the Periodic Table, $(R'C_2R'')_z$ represents at least one moiety bonded to M by at least one pi-bond between carbon and metal, $C_2$ represents two carbons bonded to each other, R' and R'' represent monovalent groups selected from the class consisting of hydrogen, halogeno, carboalkoxy, alkyl, aryl, cycloaliphatic hydrocarbon groups, alkoxy, and silyl, CO represents carbonyl bonded to one of the class consisting of M and $C_2$, B represents a group bonded to one of the class consisting of M and $C_2$ and is selected from the class consisting of hydrogen, mercury, halogen, alkyl, aryl and acyl, $x$ represents an integer of from 1 to 4, $y$ represents an integer of from 1 to 10, $z$ represents an integer of from 1 to 6, and $w$ represents an integer of from 0 to 4, with (b) a reactant containing at least one element selected from the Groups VA and VIA of the Periodic Table, whereby the pi-bonds present in said complex are broken and said element attaches to the $(R'C_2R'')_z$ moiety to form said hetero-atom containing organic compound free of pi-bonds between carbon and metal.

2. A process as claimed in claim 1, in which the metal of the organo-metallic complex is iron.

3. A process as claimed in claim 1, in which the metal of the organo-metallic complex is cobalt.

4. A process as claimed in claim 1, which the metal of the organo-metallic complex is nickel.

5. A process as claimed in claim 1, in which the metal of the organo-metallic complex is molybdenum.

6. A process as claimed in claim 1, in which the hetero-atom containing reactant is nitrosobenzene.

7. A process as claimed in claim 1, in which the hetero-atom containing reactant is sulfur.

8. A process as claimed in claim 1, in which the hetero-atom containing reactant is potassium polyselenide.

9. A process as claimed in claim 1, in which the hetero-atom containing reactant is N,N-dichloro-p-toluenesulfonamide.

10. A process as claimed in claim 1, in which the hetero-atom containing reactant is selenium.

11. A process as claimed in claim 1, in which the hetero-atom containing reactant is phenyldichlorophosphine.

12. A process as claimed in claim 1, in which the hetero-atom containing reactant is phenyldichloroarsine.

13. A process as claimed in claim 1, in which the hetero-atom containing reactant is sulfur dichloride.

14. A process as claimed in claim 1, in which a stoichiometric excess of the hetero-atom containing reactant is employed.

15. A process as claimed in claim 14, in which an organic solvent selected from the group consisting of benzene, petroleum ether, ether, tetrahydrofuran and beta-ethoxy ethanol is employed.

16. A process as claimed in claim 15, in which the reaction mixture is initially activated by ultraviolet radiation.

17. A process as claimed in claim 1, in which the reaction mixture is initially activated by ultraviolet radiation.

No references cited.

ALEX MAZEL, *Primary Examiner.*

IRVING MARCUS, WALTER A. MODANCE,
*Examiners.*

J. T. MILLER, A. D. ROLLINS, *Assistant Examiners.*